(12) United States Patent
Peak et al.

(10) Patent No.: US 10,810,680 B2
(45) Date of Patent: *Oct. 20, 2020

(54) LOCATION AND SOCIAL NETWORK DATA PREDICTIVE ANALYSIS SYSTEM

(71) Applicant: Hartford Fire Insurance Company, Hartford, CT (US)

(72) Inventors: David F. Peak, Avon, CT (US); Anil Vasagiri, Hamden, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 5 days.

This patent is subject to a terminal disclaimer.

(21) Appl. No.: 16/195,124

(22) Filed: Nov. 19, 2018

(65) Prior Publication Data

US 2019/0087910 A1 Mar. 21, 2019

Related U.S. Application Data

(63) Continuation of application No. 15/161,967, filed on May 23, 2016, now Pat. No. 10,147,142, which is a
(Continued)

(51) Int. Cl.
*G06Q 40/08* (2012.01)
*G06K 19/06* (2006.01)
(Continued)

(52) U.S. Cl.
CPC ....... *G06Q 40/08* (2013.01); *G06K 19/06037* (2013.01); *G06N 5/02* (2013.01);
(Continued)

(58) Field of Classification Search
CPC ........ G06Q 10/00; G06Q 20/00; G06Q 30/00; G06Q 40/00
(Continued)

(56) References Cited

U.S. PATENT DOCUMENTS

| 6,119,093 | A | 9/2000 | Walker et al. |
| 6,236,973 | B1 | 5/2001 | Dillard |

(Continued)

OTHER PUBLICATIONS

Young Ha, "In Few Years, Social Network Data May Be Used in Underwriting", MyNewMarket.com, Oct. 13, 2011.*

*Primary Examiner* — Frantzy Poinvil
(74) *Attorney, Agent, or Firm* — Howard IP Law Group, PC

(57) ABSTRACT

According to some embodiments, historic transaction data and loss data may be received from a data storage device. Geographic data and dynamically updated social network data corresponding to the entity may also be received and automatically analyzed by an estimator device to determine an estimated number of employees employed by the entity and similar entities having at least one common characteristic with the entity. A data weighting device generates weighted data by applying weighting factors to the received data including a weighting factor based on a location of users providing social networking posts and a weighting factor based on whether the social network data includes image, video, or audio data. At least one risk-related parameter corresponding to the entity is determined by a comparison engine that applies predictive models to (i) the weighted data, (ii) the estimated number of employees, and (iii) the similar entities to the entity.

16 Claims, 7 Drawing Sheets

Related U.S. Application Data continuation of application No. 13/364,733, filed on Feb. 2, 2012, now Pat. No. 9,349,146.

(60) Provisional application No. 61/565,668, filed on Dec. 1, 2011.

(51) Int. Cl.

| | | |
|---|---|---|
| *G06N 5/02* | (2006.01) | |
| *H04L 12/58* | (2006.01) | |
| *H04L 29/08* | (2006.01) | |
| *G06Q 50/00* | (2012.01) | |

(52) U.S. Cl.
CPC .............. *H04L 51/32* (2013.01); *H04L 67/18* (2013.01); *G06Q 50/01* (2013.01)

(58) Field of Classification Search
USPC ...................................... 705/3–44
See application file for complete search history.

(56) References Cited

U.S. PATENT DOCUMENTS

| | | | |
|---|---|---|---|
| 7,685,008 B2 | 3/2010 | McGiffin et al. | |
| 7,945,497 B2 | 5/2011 | Kenefick et al. | |
| 8,108,229 B2 | 1/2012 | Ika et al. | |
| 8,185,415 B2 | 5/2012 | Rosen et al. | |
| 8,332,244 B1 | 12/2012 | Karam et al. | |
| 8,332,245 B2* | 12/2012 | Harkensee | G06Q 30/02 |
| | | | 705/4 |
| 8,396,796 B1 | 3/2013 | Vu et al. | |
| 8,660,864 B2* | 2/2014 | Krause | G06Q 40/08 |
| | | | 705/4 |
| 8,682,699 B2* | 3/2014 | Collins | G06Q 40/08 |
| | | | 705/4 |
| 8,725,541 B2* | 5/2014 | Andrist | G06Q 40/08 |
| | | | 705/4 |
| 8,799,028 B1* | 8/2014 | Warden | G06Q 40/08 |
| | | | 705/4 |
| 8,924,241 B2* | 12/2014 | Grosso | G06Q 10/00 |
| | | | 705/4 |
| 9,224,171 B2* | 12/2015 | Peak | G06F 19/3418 |
| 9,818,158 B1* | 11/2017 | Devereaux | G06K 9/00637 |
| 2002/0091991 A1* | 7/2002 | Castro | G06F 9/06 |
| | | | 717/106 |
| 2007/0021987 A1 | 1/2007 | Binns et al. | |
| 2008/0077450 A1 | 3/2008 | Klippel | |
| 2009/0182585 A1 | 7/2009 | Harkensee et al. | |
| 2010/0131301 A1 | 5/2010 | Collopy et al. | |
| 2010/0274594 A1 | 10/2010 | Vridhagriswaran et al. | |
| 2010/0324942 A1 | 12/2010 | Rogers et al. | |
| 2011/0066454 A1 | 3/2011 | Rosauer et al. | |
| 2011/0066472 A1 | 3/2011 | Scheider | |
| 2011/0153369 A1 | 6/2011 | Feldman et al. | |
| 2012/0158434 A1 | 6/2012 | Reid | |
| 2012/0239438 A1 | 9/2012 | Hemmings et al. | |
| 2012/0271664 A1* | 10/2012 | McGiffin | G06Q 40/00 |
| | | | 705/4 |
| 2012/0290329 A1 | 11/2012 | Ross | |
| 2013/0013344 A1 | 1/2013 | Ernstberger et al. | |
| 2013/0204645 A1 | 8/2013 | Lehman et al. | |
| 2014/0372150 A1* | 12/2014 | Karle | G06Q 40/08 |
| | | | 705/4 |
| 2015/0019266 A1* | 1/2015 | Stempora | G06Q 40/08 |
| | | | 705/4 |
| 2015/0025917 A1* | 1/2015 | Stempora | G06Q 40/08 |
| | | | 705/4 |
| 2015/0039351 A1* | 2/2015 | Bell | G06Q 40/08 |
| | | | 705/4 |
| 2015/0187016 A1* | 7/2015 | Adams | G06Q 40/08 |
| | | | 705/4 |
| 2015/0339780 A1* | 11/2015 | Collopy | G06Q 40/08 |
| | | | 705/4 |
| 2016/0379309 A1* | 12/2016 | Shikhare | G06Q 40/08 |
| | | | 705/4 |

* cited by examiner

LOCATION AND SOCIAL NETWORK DATA PREDICTIVE ANALYSIS SYSTEM

CROSS-REFERENCE TO RELATED APPLICATIONS

This patent application is a continuation of U.S. patent application Ser. No. 15/161,967 entitled "Location and Social Network Data Entity Identification System" filed May 23, 2016, now U.S. Pat. No. 10,147,142, which claims priority to, and benefit of, U.S. patent application Ser. No. 13/364,733 entitled "Systems and Methods to Intelligently Determine Insurance Information Based on Identified Businesses" filed Feb. 2, 2012, now U.S. Pat. No. 9,349,146, which claims priority to, and benefit of, under 35 U.S.C. 119(e), U.S. Provisional Patent Application No. 61/565,668 entitled "Systems and Methods to Determine Insurance Information Based on an Automatically Identified Set of Related Businesses" filed Dec. 1, 2011, the entire contents of each of which are incorporated herein by reference for all purposes.

BACKGROUND

In some cases, it can be hard to accurately provide insurance information to a potential business insurance customer. For example, a small business owner might be unable or reluctant to provide detailed information about prior claims, detailed employee data, etc. As a result, it can be difficult for an insurance provider to suggest appropriate types of insurance policies, determine a recommended amount of insurance coverage and/or deductibles, and/or to predict likely insurance premium values for the small business owner. These difficulties can cause small business owners to miss opportunities to protect their enterprises. For example, a small business owner might find it difficult to determine the types and amounts of insurance coverage other business owners have purchased as well as the amount of claims that were made by those businesses.

It would therefore be desirable to provide systems and methods to efficiently and accurately determine insurance information for a potential business insurance customer.

SUMMARY OF THE INVENTION

According to some embodiments, systems, methods, apparatus, computer program code and means may be provided to efficiently and accurately provide insurance information to potential customers. In some embodiments, historic transaction data and loss data may be received from a data storage device. Information about a potential business insurance customer may also be received and automatically analyzed to identify a set of related businesses. A coverage comparison engine may then determine insurance information for the potential business insurance customer based at least in part on historic transaction data and loss data associated with the set of related businesses.

Some embodiments comprise: means for receiving historic transaction data and loss data from a data storage device; means for receiving information about a potential business insurance customer; means for automatically analyzing the received information about the potential business insurance customer to identify a set of related businesses; and means for determining, by a coverage comparison engine, insurance information for the potential business insurance customer based at least in part on historic transaction data and loss data associated with the set of related businesses.

A technical effect of some embodiments of the invention is may be an improved and computerized method of determining insurance information for a potential business insurance customer. With these and other advantages and features that will become hereinafter apparent, a more complete understanding of the nature of the invention can be obtained by referring to the following detailed description and to the drawings appended hereto.

DETAILED DESCRIPTION

Figure 1:
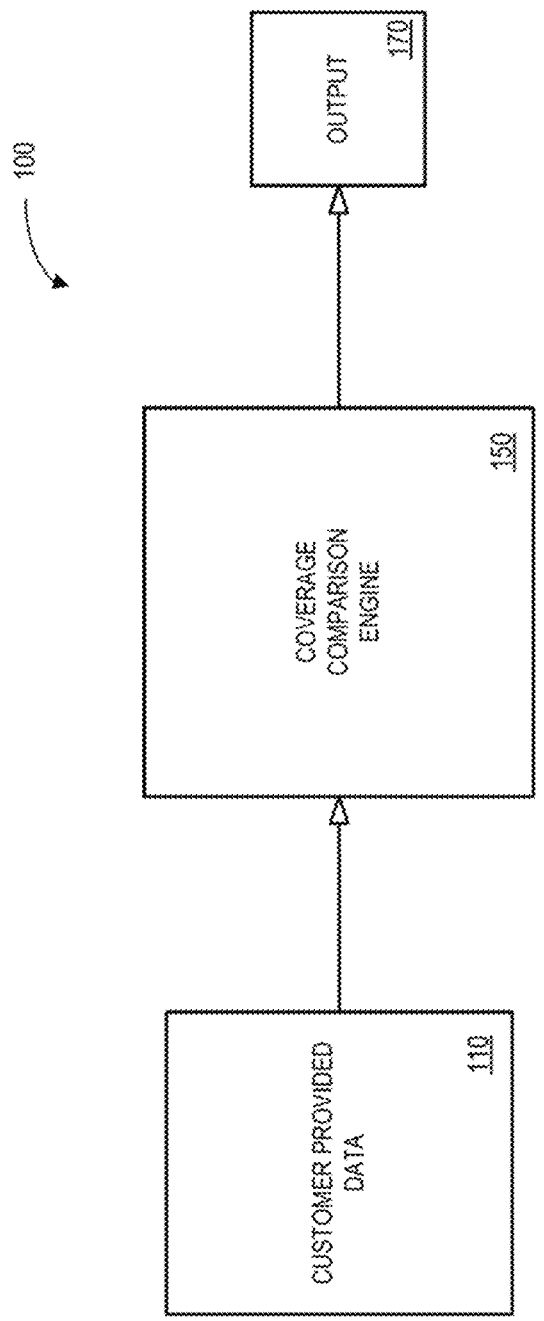
FIG. 1 is block diagram of a system according to some embodiments of the present invention.

FIG. 1 is block diagram of a system 100 according to some embodiments of the present invention. In particular, a coverage comparison engine 150 associated with an insurance provider may receive customer provided data 110. The customer provided data 110 might be received, for example, directly from a customer (e.g., via a web page). The customer provided data 110 might be received via, for example, Personal Computers (PCs), laptop computers, and/or wireless telephones that can transmit insurance data to the coverage comparison engine 150. The coverage comparison engine 150 may then generate an output 170 based at least in part on the customer provided data 110 in accordance with any of the embodiments described herein.

According to some embodiments, the "automated" coverage comparison engine 150 generates the output 170, such as an indication of a recommended level of insurance coverage for the customer. As used herein, the term "automated" may refer to, for example, actions that can be performed with little or no human intervention. By way of example only, the coverage comparison engine 150 may be associated and/or communicate with a PC, an enterprise server, or a database farm. According to some embodiments, the coverage comparison engine 150 is associated with an insurance provider or a number of different insurance providers. Moreover, according to some embodiments, a model (e.g., a multi-dimensional and/or weighted model) at the platform 150 may facilitate the generation of the output 170.

As used herein, devices including those associated with the coverage comparison engine, and any other device described herein may exchange information via any communication network (not illustrated in FIG. 1) which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

Note that the coverage comparison engine 150 may be associated with various types of insurance policies, including personal insurance, business insurance, workers compensation, liability insurance, and wealth management offerings, including property and casualty insurance, life insurance, retirement and education investment products, and group benefits offerings.

Although a single coverage comparison engine 150 is shown in FIG. 1, any number of such devices may be included. Moreover, various devices described herein might be combined according to embodiments of the present invention. For example, in some embodiments, the coverage comparison engine 150 and a historic loss database might be co-located and/or may comprise a single apparatus. Moreover, according to some embodiments, internal data and/or third-party data (e.g., Dunn and Bradstreet data or similar information) may be used to supplement the information in a historic loss database.

Figure 2:
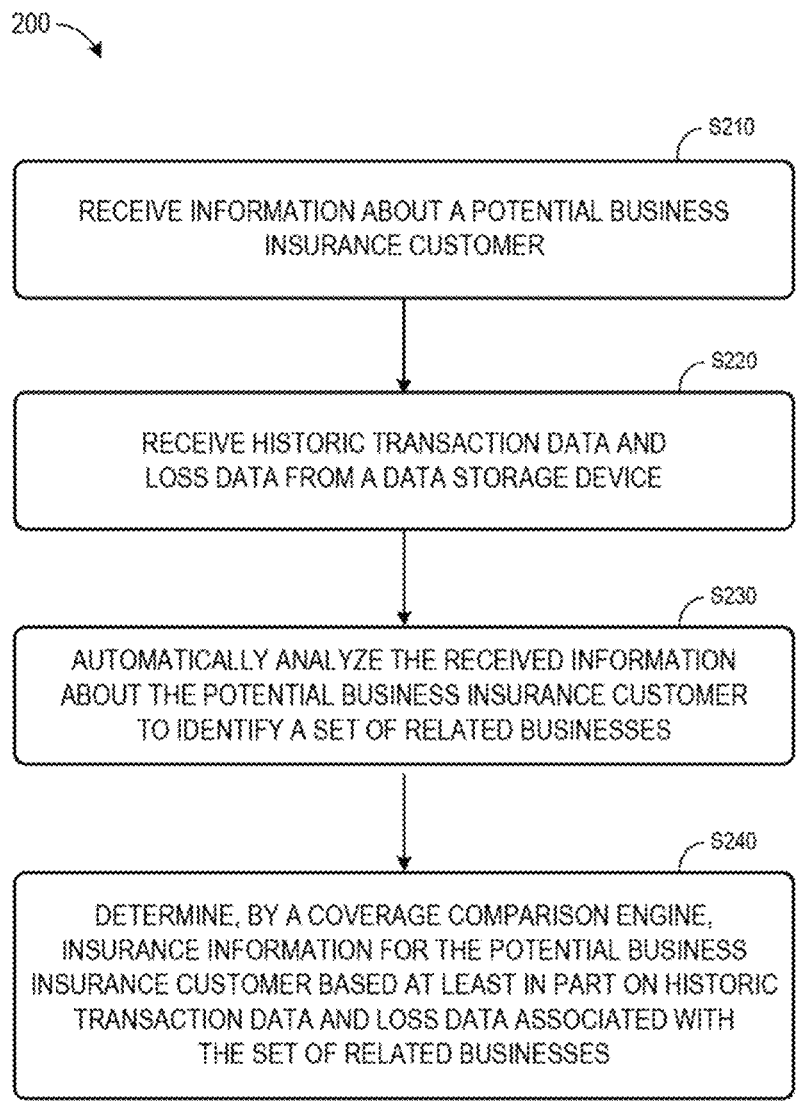
FIG. 2 illustrates a process in accordance with some embodiments of the present invention.

FIG. 2 illustrates a process 200 that might be performed, for example, by some or all of the elements of the system 100 described with respect to FIG. 1 according to some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

The process 200 may be performed to facilitate a determination of insurance information for a potential business insurance customer. Pursuant to some embodiments, at S210, information about a potential business insurance customer may be received. The information about the potential business insurance customer might be associated with, for example, a social media site, an email address, a ZIP code, a business name, a postal address, and/or a business classification code (e.g., indicating that the business is primarily associated with "office" or "construction" work). The information about the potential business insurance customer might be received from, for example; an insurance agent, an insurance agency, a party entering information on behalf of an insurance agent, or a potential insurance customer (e.g., a small business owner). According to some embodiments, information associated with a plurality of social media networks and/or other data sources may be combined. Moreover, according to some embodiments, information may be imported from an accounting application a human resources application. For example, information about a total amount of sales during the last twelve months or information about a vehicle owned by a business might be imported from an accounting application (e.g., associated with bookkeeping or tax reporting). Note that the imported information might contain specific values or generalized profile information associated with the potential business insurance customer.

At S220 historic transaction data and loss data may be received from a data storage device. The historic transaction data and loss data might represent, for example, insurance claims associated with tens of thousands of insurance policies over many years.

At S230, the received information about the potential business insurance customer may be automatically analyzed to identify a set of related businesses. For example, a potential customer might indicate that his or her small business is associated with a dry cleaning enterprise. That information might then be used to identify related businesses, such as other dry cleaners or other companies that use potentially harmful chemicals. According to some embodiments, the set of related businesses is further identified based at least in part on information from a third party data store. The information from the third party data store might include, for example, coverage and policy transaction data and loss data from an information aggregator. Moreover, according to some embodiments, the set of related businesses may be further identified based at least in part on information from an internal data store (e.g., internal to the insurance provider).

At S240, insurance information may be determined by a coverage comparison engine for the potential business insurance customer based at least in part on historic transaction data and loss data associated with the set of related businesses. The insurance information determined for the potential business insurance customer might be associated with, for example, risk characteristics, a recommended type of insurance coverage, premium information, historical losses, average claim values, and/or a claim frequency value.

Figure 3:
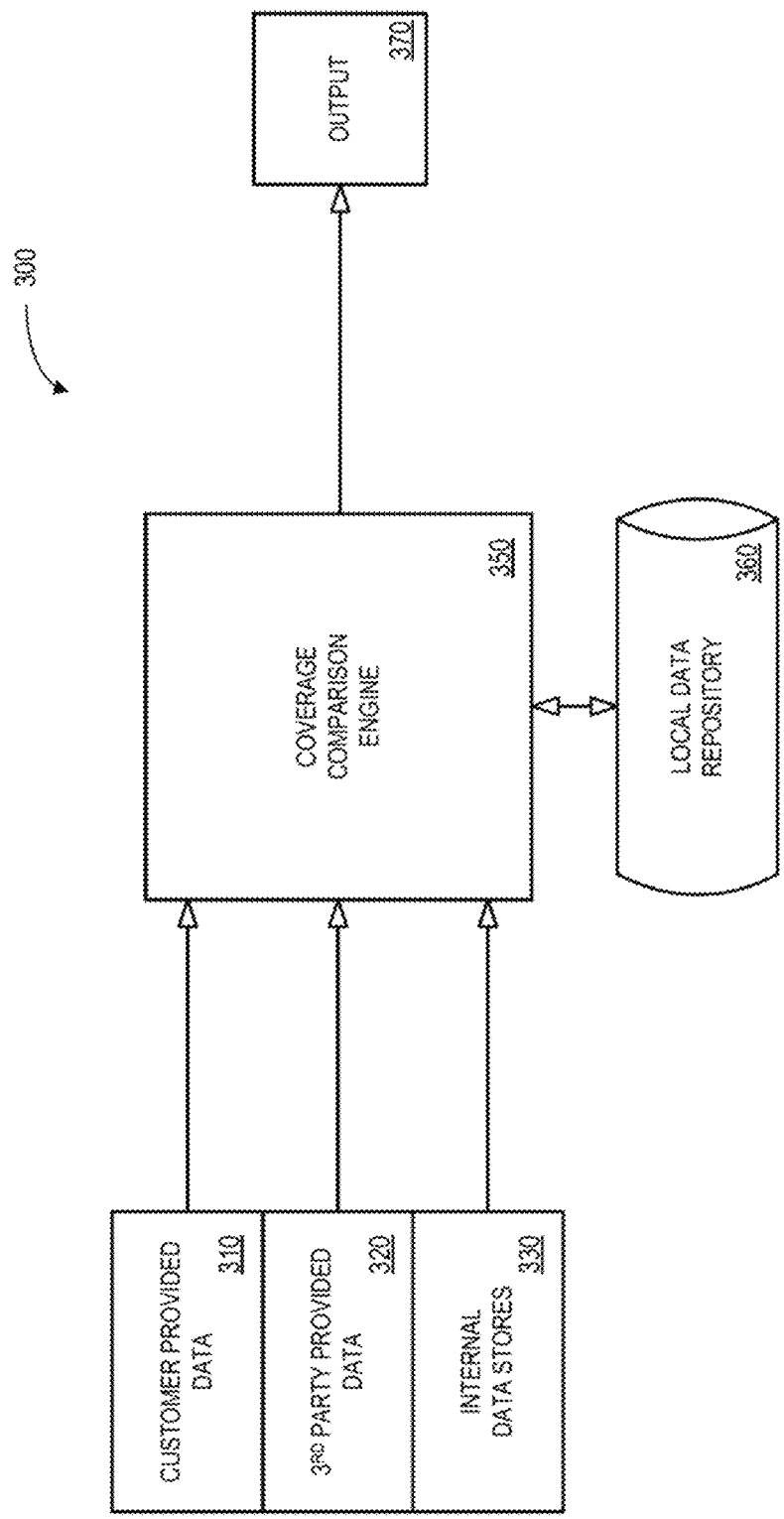
FIG. 3 is block diagram of a system according to some embodiments of the present invention.

FIG. 3 is block diagram of a system according to some embodiments of the present invention. As before, a coverage comparison engine 350 associated with an insurance provider may receive customer provided data 310. The customer provided data 310 might be received, for example, directly from a customer (e.g., via a web page) via, for example, a PC, laptop computer, and/or wireless telephone that can transmit insurance data to the coverage comparison engine 350. The coverage comparison engine 350 may then generate an output 370 based at least in part on the customer provided data 310 in accordance with any of the embodiments described herein, such as an indication of a recommended level of insurance coverage for the customer.

Although a single coverage comparison engine 350 is shown in FIG. 3, any number of such devices may be included. Moreover, various devices described herein might be combined according to embodiments of the present invention. For example, in some embodiments, the coverage comparison engine 350 and a local data repository 360 might be co-located and/or may comprise a single apparatus. Moreover, according to some embodiments, internal data stores 330 and/or third-party provided data 320 (e.g., Dunn and Bradstreet data or similar information) may be used to supplement the customer provided data 310.

According to some embodiments, the coverage comparison engine may be associated with one or more predictive models to take into account a large number of customer and/or underwriting parameters. The predictive model(s), in various implementations, may include one or more of neural networks, Bayesian networks (such as Hidden Markov models), expert systems, decision trees, collections of decision trees, support vector machines, or other systems known in the art for addressing problems with large numbers of variables. Preferably, the predictive model(s) are trained on prior data and outcomes known to an insurance company. The specific data and outcomes analyzed vary depending on the desired functionality of the particular predictive model. The particular data parameters selected for analysis in the training process may be determined by using regression analysis and/or other statistical techniques known in the art for identifying relevant variables in multivariable systems.

The parameters can be selected from any of the structured data parameters stored in the present system, whether the parameters were input into the system originally in a structured format or whether they were extracted from previously unstructured text, such as from text based social media network or any other data. By way of example, a predicted number of employees or range of probable sales values may be used in connection with an estimated amount of risk or exposure.

In the present invention, the selection of weighting factors may improve the predictive power of the coverage comparison engine, as well as to increase the perceived or actual fairness of received inputs or output 370 insurance data. For example, more established and highly frequented social networking sites may be associated with a higher credibility factor, while newer, less established sites would be associated with a relatively lower credibility factor. By way of further example, more current user posts or other social networking updates may be accorded a higher weighting while older, less current information would be weighted lower.

According to some embodiments, information about a customer might be used to adjust one or more weighting factors. For example, location information associated with a customer might be used to adjust one or more weighting factors. For example, a user who generates a social networking post or request from a work site might be given more credibility as compared to other potential customers. As other examples, a customer who has a high reputation on a web site, who generates many social media network posts, and/or who has experienced a lot of transactions with an insurer might be associated with a relatively high weighting factor. Moreover, the inclusion of image, video, and/or audio information might increase a weighting factor associated with received information.

Figure 4:
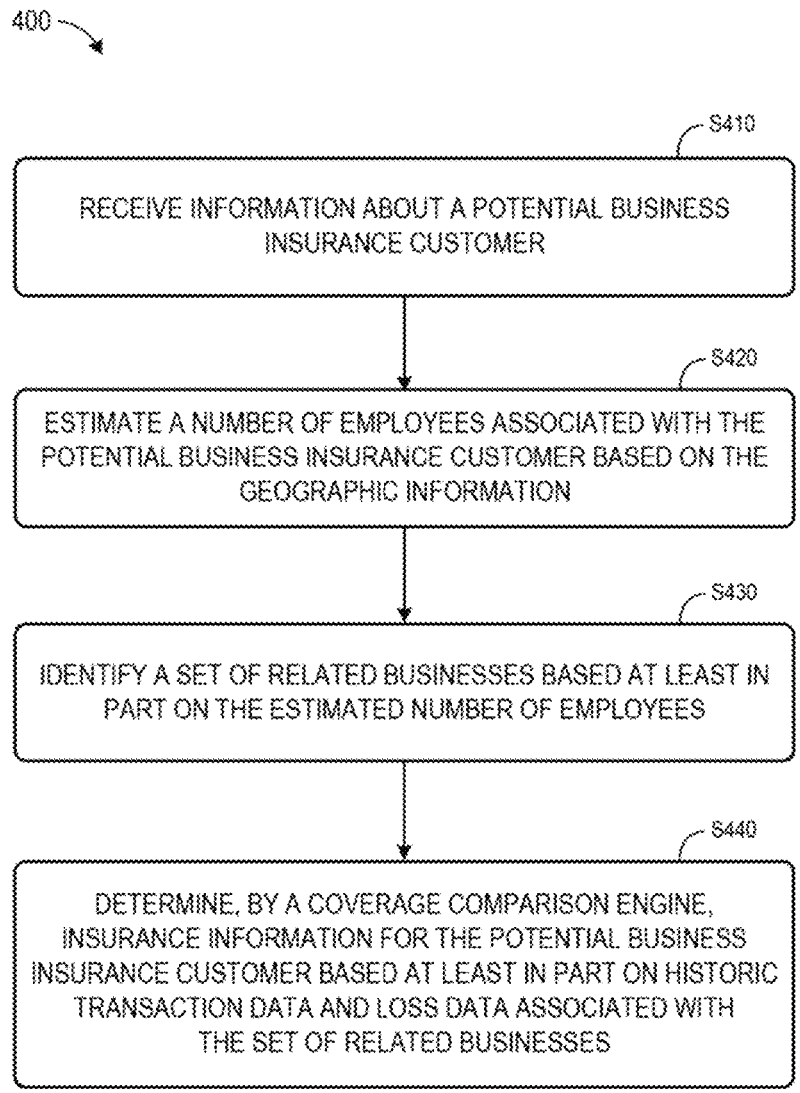
FIG. 4 illustrates a method according to some embodiments of the present invention.

FIG. 4 illustrates a method 400 according to some other embodiments of the present invention. At S410, information about a potential business insurance customer may be received. The information about the potential business insurance customer might be associated with, for example, a social media site, an email address, a ZIP code, a business name, a postal address, and/or a business classification code. According to this embodiment, the received information about the potential business customer includes geographic information, such as a postal address or ZIP code.

At S420, a number of employees associated with the potential business insurance customer is estimated based on the geographic information. For example, an insurance model might determine that a vast majority of businesses in a particular ZIP code have less than twenty employees. As a result, it may be inferred that the potential business insurance customer in that ZIP code will also have less than twenty employees. Note that instead of a number of employees, embodiments may instead infer a total payroll value (and/or job titles or benefits associated with employees), a property value, a type of industry, or any other useful information. Moreover, note that information from multiple social media networks and/or other data sources might be combined in accordance with any of the embodiments described herein.

At S430, the estimated number of employees is automatically analyzed to identify a set of related businesses (e.g., other businesses having a similar number of employees). At S440, insurance information may be determined by a coverage comparison engine for the potential business insurance customer based at least in part on historic transaction data and loss data associated with the set of related businesses.

The insurance information determined for the potential business insurance customer might be associated with, for example, risk characteristics, a recommended type of insurance coverage, and/or premium information.

Figure 5:
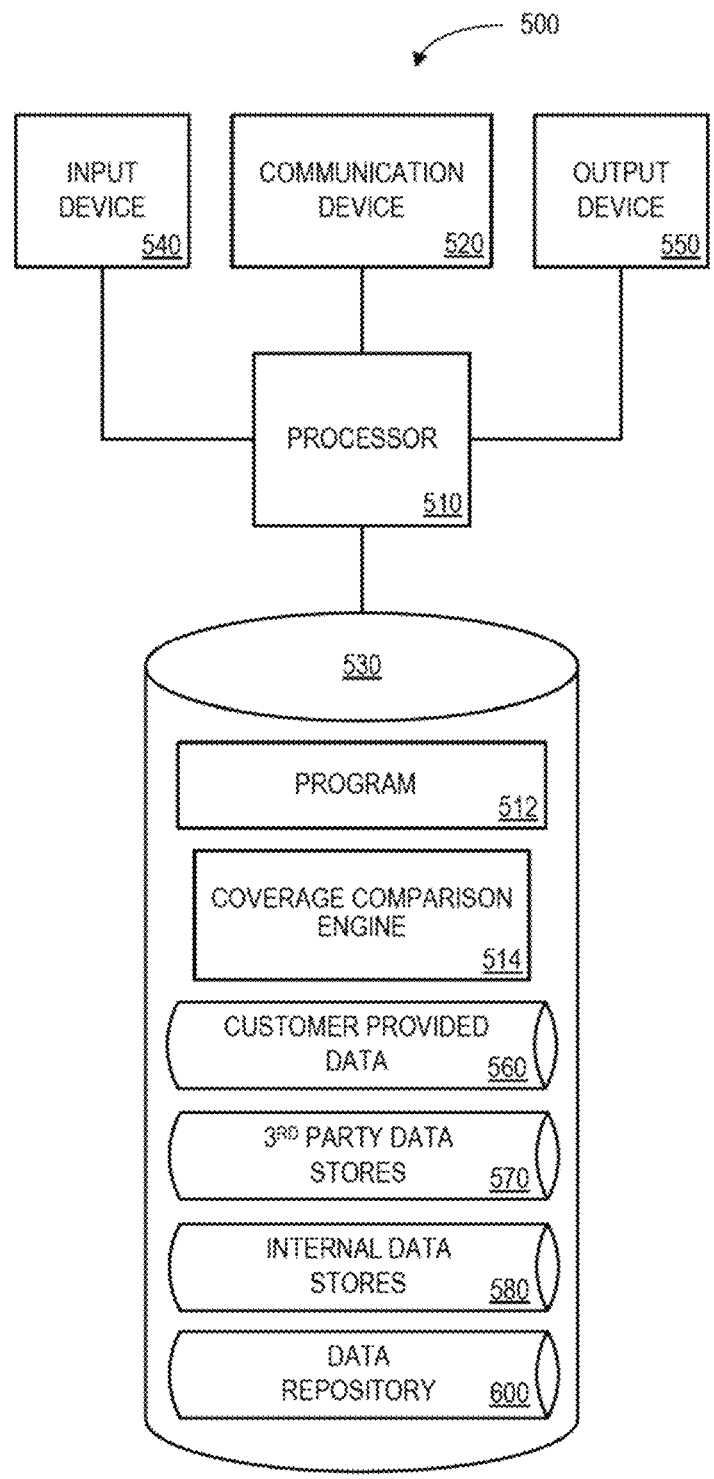
FIG. 5 is an example of coverage comparison platform according to some embodiments.

As a result of the embodiments described herein, an improved system and method to facilitate a determination of insurance information for a potential business insurance customer may be achieved. Note that embodiments described herein may be implemented in any number of different ways. For example, FIG. 5 is a block diagram overview of a coverage comparison platform 500 according to some embodiments. The coverage comparison platform 500 may be, for example, associated with the system 100 of FIG. 1 or the system 300 of FIG. 3. The coverage comparison platform 500 comprises a processor 510, such as one or more commercially available Central Processing Units (CPUs) in the form of one-chip microprocessors, coupled to a communication device or interface 520 configured to communicate via a communication network (not shown in FIG. 5). The communication device 520 may be used to communicate, for example, with one or more remote customer or agent devices. The coverage comparison platform 500 further includes an input device 540 (e.g., a mouse and/or keyboard to enter rule and/or model adjustments) and an output device 550 (e.g., a computer monitor to display reports and/or aggregated results to an administrator).

The processor 510 also communicates with a storage device 530. The storage device 530 may comprise any appropriate information storage device, including combinations of magnetic storage devices (e.g., a hard disk drive), optical storage devices, mobile telephones, vehicle computers, and/or semiconductor memory devices. The storage device 530 stores a program 512 and/or a coverage comparison engine 514 for controlling the processor 510. The processor 510 performs instructions of the programs 512, 514, and thereby operates in accordance with any of the embodiments described herein. For example, the processor 510 may receive historic transaction data and loss data from a data storage device. Information about a potential business insurance customer may also be received by the processor 510 and automatically analyzed to identify a set of related businesses. The coverage comparison engine 514 may then determine insurance information for the potential business insurance customer based at least in part on historic transaction data and loss data associated with the set of related businesses.

The programs 512, 514 may be stored in a compressed, uncompiled and/or encrypted format. The programs 512, 514 may furthermore include other program elements, such as an operating system, a database management system, and/or device drivers used by the processor 510 to interface with peripheral devices.

As used herein, information may be "received" by or "transmitted" to, for example: (i) the coverage comparison platform 500 from another device; or (ii) a software application or module within the coverage comparison platform 500 from another software application, module, or any other source.

In some embodiments (such as shown in FIG. 5), the storage device 530 stores customer provided data 560, third party data stores 570, internal data stores 580, and a data repository 600. Examples of a database that may be used in connection with the coverage comparison platform 500 will now be described in detail with respect to FIG. 6. Note that the database described herein is only an example, and additional and/or different information may be stored therein. Moreover, various databases might be split or combined in accordance with any of the embodiments described herein.

Figure 6:
FIG. 6 is a tabular portion of a data repository according to some embodiments.

Referring to FIG. 6, a table is shown that represents the data repository 600 that may be stored at the coverage comparison platform 500 according to some embodiments. The table may include, for example, entries identifying potential small business customers requesting information in connection with insurance policies. The table may also define fields 602, 604, 606, 608, 610 for each of the entries. The fields 602, 604, 606, 608, 610 may, according to some embodiments, specify: a customer identifier 602, an agent identifier 604, an insurance category 606, customer provided data 608, and a set of related businesses. The information in the submitted data database 600 may be created and updated, for example, whenever data is submitted by a customer.

The customer identifier 602 may be, for example, a unique alphanumeric code identifying a potential small business customer who has provided information (e.g., in connection with a quote request for an insurance policy application). The agent identifier 604 might indicate the agent who submits the data and the insurance category 606 might indicate the type of insurance being applied for by the agent. The customer provided data 608 might represent, for example, an email address, ZIP code, postal address, etc. The set of related businesses 610 may be an automatically determined list of businesses that may be related to the customer associated with the customer identifier 602. The set of related businesses 610 may then be used to evaluate historical risk data, loss values, etc. that may be used to generate insurance information for that customer.

Figure 7:
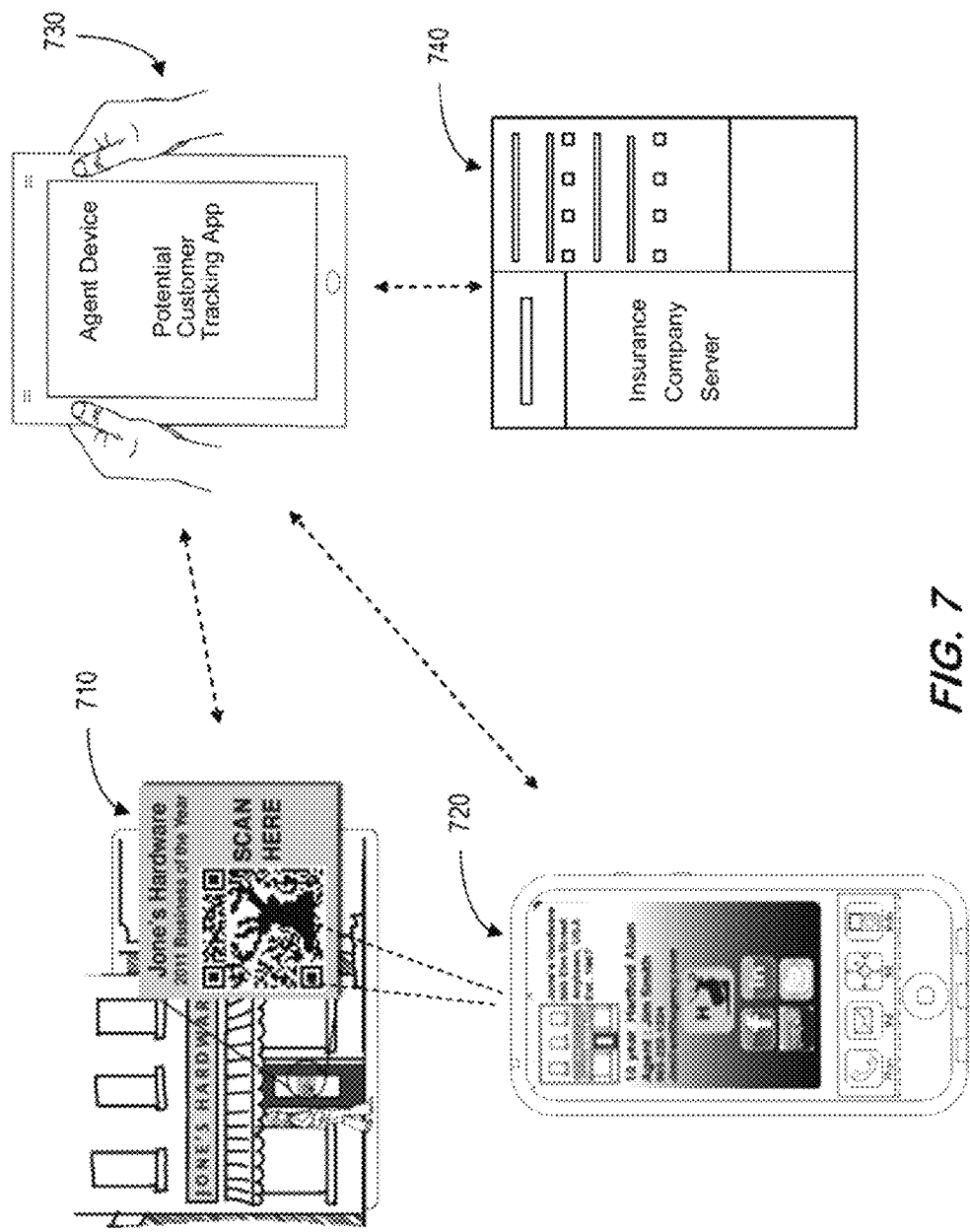
FIG. 7 is an example of receiving information about a potential business insurance customer according to some embodiments.

Information about a potential business insurance customer may be received in any of a number of different ways. FIG. 7 is an example of receiving information about a potential business insurance customer according to some embodiments. In this example, a potential business insurance customer might scan a Quick Response ("QR") matrix or two-dimensional bar code 710 associated with his or her business, take a picture of the business, and/or otherwise enter information via a mobile device 720. Mobile device 720 may be a smartphone, personal computer or tablet computing device and may be configured to capture and display information associated with the present invention. According to some embodiments, the information might be sent through an insurance agent device 730 (e.g., associated with a potential customer tracking application) before being received by an insurance company server 740. According to other embodiments, the information may be sent directly from the customer's mobile device 720 to the insurance company server 740. The insurance company server 740 may then execute the steps described with respect to FIG. 2 or any other embodiments described herein. According to some embodiments, a third-party service might provide questions to patrons of the potential small business client and this information may be used by the insurance company server.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). Additional, one or more of the elements described herein may be practiced in a distributed cloud computing environment where tasks are performed by logically or physically remote processing devices that are linked through one or more communications networks.

Applicants have discovered that embodiments described herein may be particularly useful in connection with insurance products. Note, however, that other types of insurance and related products may also benefit from the invention. For example, embodiments of the present invention may be used to determine data for financial, medical, educational, and other types of information.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A computer system comprising:
a data storage device storing historic transaction data and historic loss data;
a communication device configured to receive business entity data comprising at least geographic data and dynamically updated data corresponding to a business entity posted on one or more computerized social networking sites;
an estimator device configured to, responsive to receipt of the business entity data by the communication device, estimate, based on the business entity data received about the business entity, a number of employees employed by the business entity;
a data weighting device configured to: apply a first weighting factor to the business entity data received from the one or more computerized social networking sites indicative of the business entity having at least a threshold number of previous transactions processed by the computer system; and apply a second weighting factor to the business entity data received from the one or more computerized social networking sites indicative of the business entity having less than the threshold number of previous transactions processed by the computer system, wherein the first weighting factor is higher than the second weighting factor; and
a comparison engine configured to receive weighted data from the data weighting device and apply one or more predictive models, trained on the historic transaction data and loss data, to the weighted data and the estimated number of employees to determine coverage information for the business entity,
wherein the communication device is further configured to output to a computer monitor the determined coverage information.

2. The system of claim 1, wherein the data weighting device is configured to determine the first weighting factor and the second weighting factor further based upon a credibility factor associated with the one or more computerized social networking sites from which the business entity data was received, wherein data from established computerized social networking sites are assigned a higher credibility factor and data from less established computerized social networking sites are assigned a lower credibility factor.

3. The system of claim 1, wherein the data weighting device is configured to determine the first weighting factor and the second weighting factor further based upon an age of social networking posts received from the one or more computerized social networking sites, wherein newer computerized social networking posts are assigned a higher weighting factor and older computerized social networking posts are assigned a lower weighting factor.

4. The system of claim 1, wherein the data weighting device is configured to determine the first weighting factor and the second weighting factor further based upon a reputation of the business entity on the one or more computerized social networking sites, wherein business entities having a reputation of at least a threshold level on the one or more computerized social networking sites are assigned a higher weighting factor and business entities having a reputation below the threshold level on the one or more computerized social networking sites are assigned a lower weighting factor.

5. The system of claim 1, wherein the data weighting device is configured to determine the first weighting factor and the second weighting factor for one or more computerized social networking posts further based upon whether the one or more computerized social networking posts include one or more of image data, video data, and audio data, wherein the one or more computerized social networking posts including the one or more of the image data, the video data, and the audio data are assigned a higher weighting factor and the one or more computerized social networking posts not including the one or more of the image data, the video data, and the audio data are assigned a lower weighting factor.

6. The system of claim 1, further comprising a computer processor configured to:
analyze the business entity data to identify one or more other business entities related to the business entity;
wherein, responsive to identification of the one or more other business entities related to the business entity, the comparison engine is configured to determine coverage information for the business entity further based upon historic transaction data and historic loss data corresponding to the one or more other business entities related to the business entity.

7. The system of claim 1, wherein the one or more predictive models comprises one or more models for addressing problems with a large number of variables including a neural network model, a Bayesian network model, an expert system model, a decision tree model, a collection of decision trees model, and a support vector machine model.

8. The system of claim 1, wherein the business entity data further comprises data imported from one or both of an accounting application and a human resources application.

9. A computer system comprising:
a data storage device storing historic transaction data and historic loss data;
a communication device configured to receive business entity data comprising at least geographic data and dynamically updated data corresponding to a business entity posted on one or more computerized social networking sites;
an estimator device configured to, responsive to receipt of the business entity data by the communication device, estimate, based on the business entity data, a number of employees employed by the business entity;
a data weighting device configured to: apply a first weighting factor to the business entity data received from the one or more computerized social networking sites indicative of the business entity having a reputation of at least a threshold level on the one or more computerized social networking sites; and
apply a second weighting factor to the business entity data from the one or more computerized social networking sites indicative of the business entity having a reputation on the one or more computerized social networking sites, wherein the first weighting factor is higher than the second weighting factor; and
a comparison engine configured to receive weighted data from the data weighting device and apply one or more predictive models, trained on the historic transaction data and loss data, to the weighted data and the estimated number of employees to determine coverage information for the business entity;
wherein the communication device is further configured to output to a computer monitor the determined coverage information.

10. The system of claim 9, wherein the data weighting device is configured to determine the first weighting factor and the second weighting factor further based upon a credibility factor associated with the one or more computerized social networking sites from which the business entity data was received, wherein data from established computerized social networking sites are assigned a higher credibility factor and data from less established computerized social networking sites are assigned a lower credibility factor.

11. The system of claim 10, wherein the data weighting device is configured to determine the first weighting factor and the second weighting factor further based upon an age of social networking posts received from the one or more computerized social networking sites, wherein newer social networking posts are assigned a higher weighting factor and older social networking posts are assigned a lower weighting factor.

12. The system of claim 11, wherein the data weighting device is configured to determine the first weighting factor and the second weighting factor further based upon a number of previous coverage transactions performed by the business entity with the computer system, wherein business entities having at least a threshold number of previous transactions are assigned a higher weighting factor and business entities having less than the threshold number of previous transactions are assigned a lower weighting factor.

13. The system of claim 12 wherein the data weighting device is configured to determine the first weighting factor and the second weighting factor for the one or more computerized social networking posts further based upon whether the one or more computerized social networking posts include one or more of image data, video data, and audio data, wherein computerized social networking posts including the one or more of the image data, the video data, and the audio data are assigned a higher weighting factor and computerized social networking posts not including the one or more of the image data, the video data, and the audio data are assigned a lower weighting factor.

14. The system of claim 9, further comprising a computer processor configured to:
analyze the business entity data to identify one or more other business entities related to the business entity;

wherein, responsive to identification of the one or more other business entities related to the business entity, the comparison engine is configured to determine coverage information for the business entity further based upon historic transaction data and historic loss data corresponding to the one or more other business entities related to the business entity.

15. The system of claim 9, wherein the received business entity data further comprises one or more of customer provided data, third-party data, and stored data about the business entity, and wherein the comparison engine is further configured to apply the one or more predictive models to one or more of the customer provided data, the third-party data, and the stored data to determine coverage information for the business entity.

16. The system of claim 9, wherein the coverage information determined for the business entity comprises one of a recommended type of coverage, a recommended level of coverage, a premium value for coverage, historical loss data corresponding to the business entity, average claim values corresponding to the business entity, and a claim frequency value corresponding to the business entity.

* * * * *